US012704810B1

(12) United States Patent
Kirkorowicz

(10) Patent No.: US 12,704,810 B1
(45) Date of Patent: Aug. 11, 2026

(54) HOLOGRAPHIC COMMUNICATION DEVICE

(71) Applicant: Gregory Kirkorowicz, Irvine, CA (US)

(72) Inventor: Gregory Kirkorowicz, Irvine, CA (US)

( * ) Notice: Subject to any disclaimer, the term of this patent is extended or adjusted under 35 U.S.C. 154(b) by 0 days.

(21) Appl. No.: 19/076,072

(22) Filed: Mar. 11, 2025

(51) Int. Cl.
*G03H 1/00* (2006.01)
*G06T 19/00* (2011.01)
*H04N 7/14* (2006.01)

(52) U.S. Cl.
CPC ......... *G03H 1/0005* (2013.01); *G06T 19/006* (2013.01); *H04N 7/142* (2013.01); *G03H 2001/0088* (2013.01); *G03H 2226/04* (2013.01)

(58) Field of Classification Search
None
See application file for complete search history.

(56) References Cited

U.S. PATENT DOCUMENTS

D762,761 S 8/2016 Daniel
9,661,272 B1 5/2017 Daniel
10,482,665 B2 11/2019 Copic
10,657,266 B2 5/2020 Hardee
11,595,615 B2 2/2023 Liu
11,783,531 B2 10/2023 Vircikova
11,792,363 B2 10/2023 Lavie
2009/0119604 A1 5/2009 Simard
2012/0141949 A1* 6/2012 Bodony ................ G01B 11/25 600/407
2012/0170089 A1* 7/2012 Kim ..................... G06F 1/1647 359/9
2013/0267319 A1* 10/2013 Kuhn ................. G07F 17/3211 463/34
2014/0168401 A1* 6/2014 De Bruijn .............. G06F 3/013 348/78
2014/0267598 A1* 9/2014 Drouin ................ G03H 1/2294 348/40
2016/0309117 A1* 10/2016 Hines ................... H04M 3/567
2017/0237941 A1* 8/2017 Vats .................... H04N 5/2628 348/14.07

(Continued)

FOREIGN PATENT DOCUMENTS

CN 109451262 A * 3/2019 ............. G06F 3/011
CN 105681656 B * 3/2020 ............ H04N 5/222

(Continued)

OTHER PUBLICATIONS

Tuoke WH-E25 Milk Way Galaxy Projector 3.5 Instruction Manual (Year: 2024).*

*Primary Examiner* — Mohammed Jebari

(57) ABSTRACT

A holographic communication device for facilitating holographic communication between a plurality of users includes a plurality of computers each located at a respective one of a plurality of locations. Each computer of the plurality of computers is in wireless communication with an extrinsic communication network. A plurality of receiver and holographic image processors each located at a respective location to capture imagery of a respective user at the respective location. Each receiver and holographic image processor is in electrical communication with a respective computer to produce a holographic image of the user who is located at the respective location such that each user who is located at each of the plurality of locations can view holographic images of other users.

12 Claims, 5 Drawing Sheets

(56) References Cited

U.S. PATENT DOCUMENTS

| | | | | |
|---|---|---|---|---|
| 2019/0128772 | A1* | 5/2019 | Heinrich | G01B 11/2545 |
| 2022/0005215 | A1* | 1/2022 | Evangelista | G06T 7/55 |
| 2022/0026736 | A1* | 1/2022 | Miller | H04N 13/39 |
| 2022/0244681 | A1* | 8/2022 | Kirkorowicz | G03H 1/2294 |
| 2022/0308359 | A1* | 9/2022 | Karafin | G06F 3/0304 |
| 2023/0236545 | A1* | 7/2023 | Yu | G03H 1/06 359/22 |
| 2023/0334754 | A1* | 10/2023 | Kirchmayer | G06T 17/00 |
| 2024/0036636 | A1* | 2/2024 | Press | G02B 30/56 |
| 2024/0226723 | A1* | 7/2024 | Bevensee | G02B 30/10 |

FOREIGN PATENT DOCUMENTS

| | | | | | |
|---|---|---|---|---|---|
| CN | 117215416 | B | * | 5/2024 | |
| CN | 114067033 | B | * | 2/2025 | G06T 13/40 |
| IN | 202311055513 | A | * | 9/2023 | |
| IN | 202541013036 | A | * | 2/2025 | |
| WO | WO2020161701 | | | 8/2020 | |

* cited by examiner

HOLOGRAPHIC COMMUNICATION DEVICE

(b) CROSS-REFERENCE TO RELATED APPLICATIONS

Not Applicable

(c) STATEMENT REGARDING FEDERALLY SPONSORED RESEARCH OR DEVELOPMENT

Not Applicable

(d) THE NAMES OF THE PARTIES TO A JOINT RESEARCH AGREEMENT

Not Applicable

(e) INCORPORATION-BY-REFERENCE OF MATERIAL SUBMITTED ON A COMPACT DISC OR AS A TEXT FILE VIA THE OFFICE ELECTRONIC FILING SYSTEM

Not Applicable

(f) STATEMENT REGARDING PRIOR DISCLOSURES BY THE INVENTOR OR JOINT INVENTOR

Not Applicable

(g) BACKGROUND OF THE INVENTION

(1) Field of the Invention

The disclosure relates to holographic devices and more particularly pertains to a new holographic device for facilitating holographic communication between a plurality of users. The device includes a plurality of computers which each stores an artificial intelligence and a plurality of receiver and holographic image processors. Each computer and each receiver and holographic image processor is located at a respective location and each computer is in communication with an extrinsic communication network. A respective receiver and holographic image processor produces a holographic image of a user at a first location and a respective receiver and holographic image processor produces a holographic image of a user at a second location. The receiver and holographic image processor at the first location projects a holographic image of the user at the second location and the receiver and holographic image processor at the second location projects a holographic image of the user at the first location to facilitate holographic communication between the user at the first location and the user at the second location.

(2) Description of Related Art Including Information Disclosed Under 37 CFR 1.97 and 1.98

The prior art relates to holographic devices including: a holographic video conference device that includes a holographic projector that includes a telescopic camera and a biometric scanner for verifying the identity of a user; a variety of holographic image projection devices that each at least includes a holographic projector for producing a holographic image that can be employed for holographic communication between a plurality of users; a holographic communication device that includes a holographic projector to produce a holographic image of a bust of a user and an artificial neural network for processing holographic image data and a pair of imaging glasses worn by a user to render a holographic image. In no instance does the prior art disclose a holographic communication device that includes a plurality of computers, each located at a respective location, which each stores an artificial intelligence for processing holographic imagery, and a plurality of receiver and holographic image processors which capture a full body holographic image of a user at a respective location and which project a full body holographic image of a user at a different location to simulate an in-person conversation between the users at each location.

(h) BRIEF SUMMARY OF THE INVENTION

An embodiment of the disclosure meets the needs presented above by generally comprising a plurality of computers each located at a respective one of a plurality of locations. Each computer of the plurality of computers is in wireless communication with an extrinsic communication network. A plurality of receiver and holographic image processors each located at a respective location to capture imagery of a respective user at the respective location. Each receiver and holographic image processor is in electrical communication with a respective computer to produce a holographic image of the user who is located at the respective location such that each user who is located at each of the plurality of locations can view holographic images of other users.

There has thus been outlined, rather broadly, the more important features of the disclosure in order that the detailed description thereof that follows may be better understood, and in order that the present contribution to the art may be better appreciated. There are additional features of the disclosure that will be described hereinafter and which will form the subject matter of the claims appended hereto.

The objects of the disclosure, along with the various features of novelty which characterize the disclosure, are pointed out with particularity in the claims annexed to and forming a part of this disclosure.

(i) BRIEF DESCRIPTION OF SEVERAL VIEWS OF THE DRAWING(S)

The disclosure will be better understood and objects other than those set forth above will become apparent when consideration is given to the following detailed description thereof. Such description makes reference to the annexed drawings wherein.

(j) DETAILED DESCRIPTION OF THE INVENTION

Figure 1:
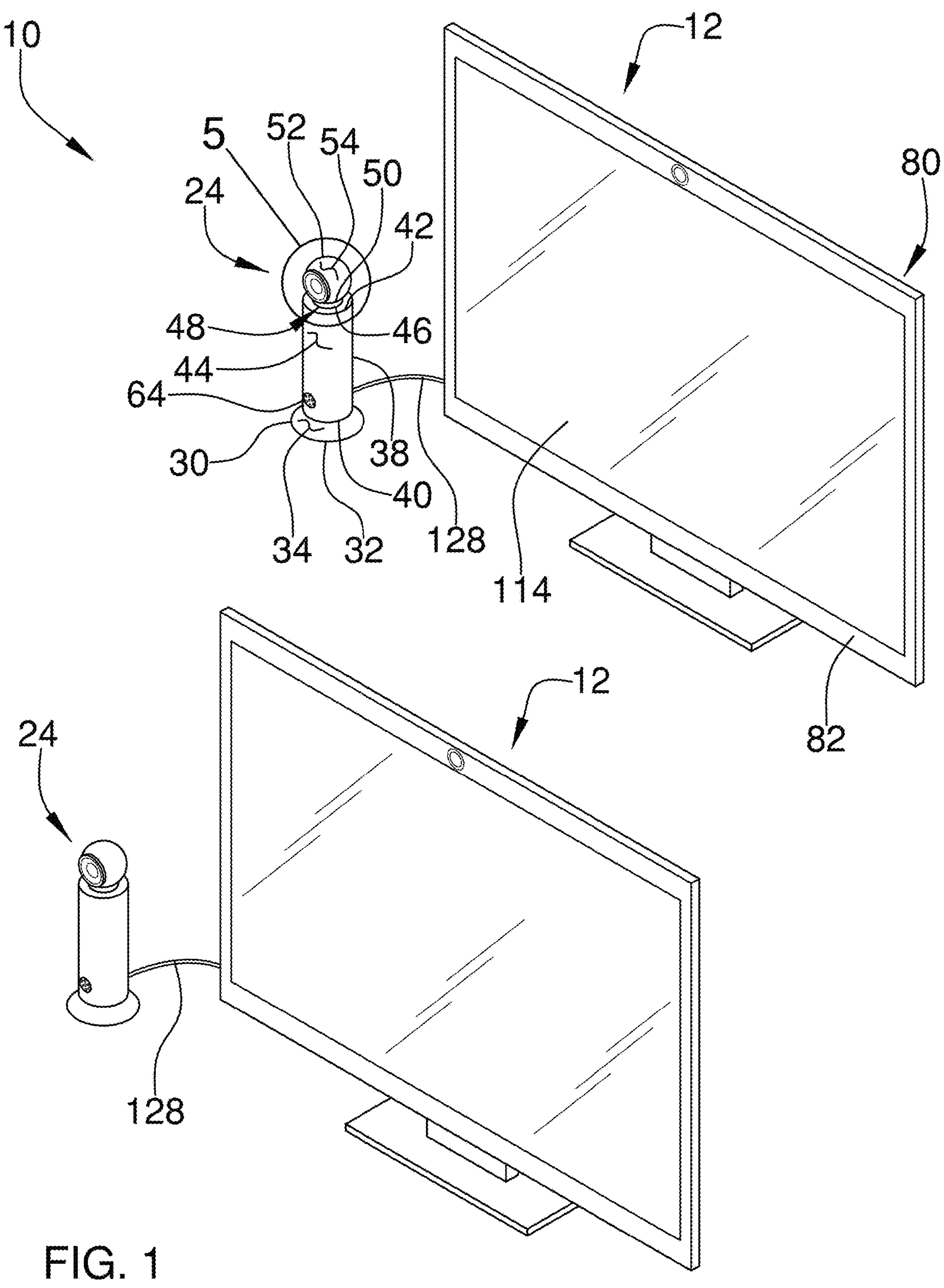
FIG. 1 is a front perspective view of a holographic communication device according to an embodiment of the disclosure.
Figure 2:
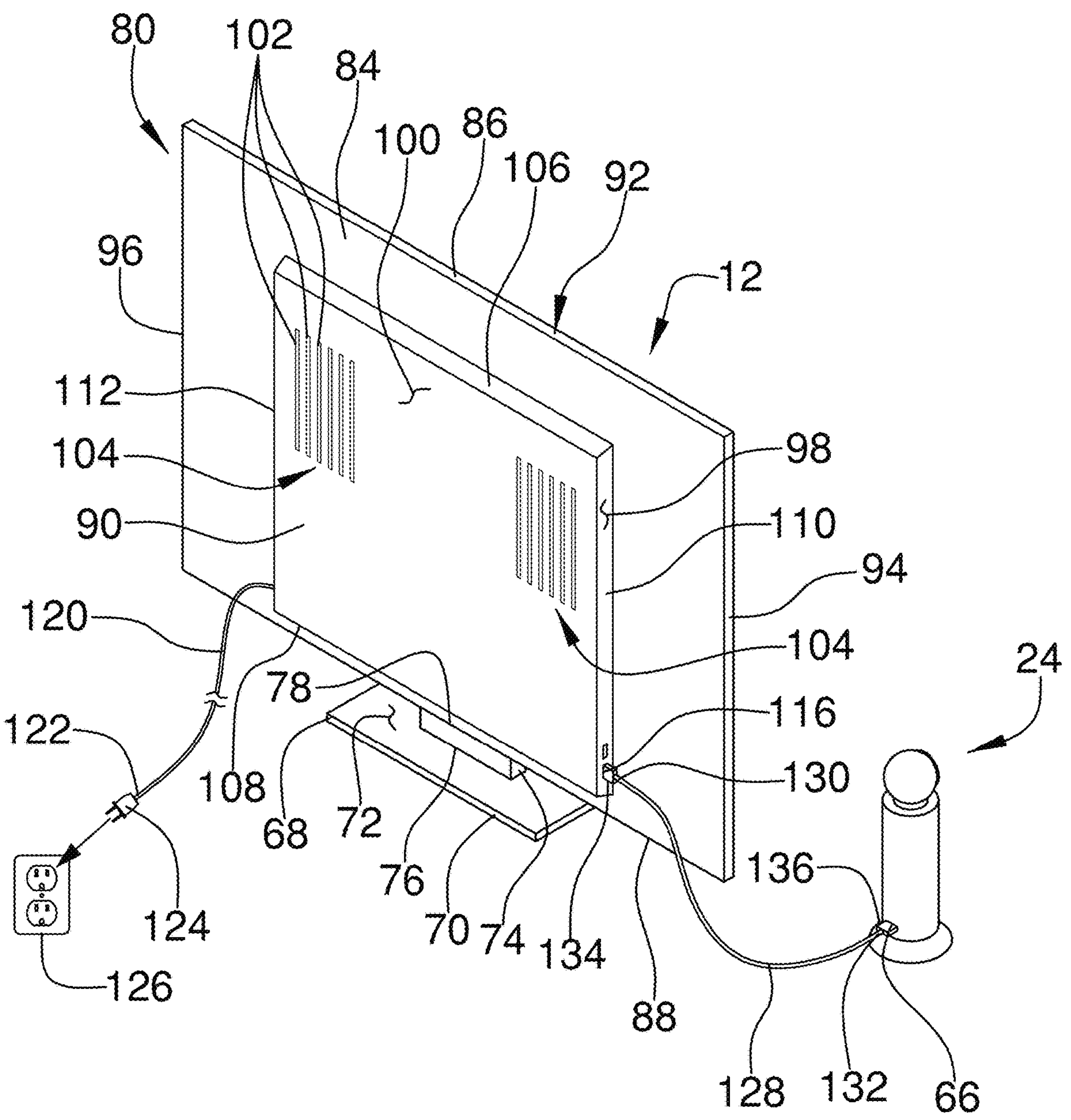
FIG. 2 is a back perspective view of a computer and a receiver and holographic image processor of an embodiment of the disclosure.
Figure 3:
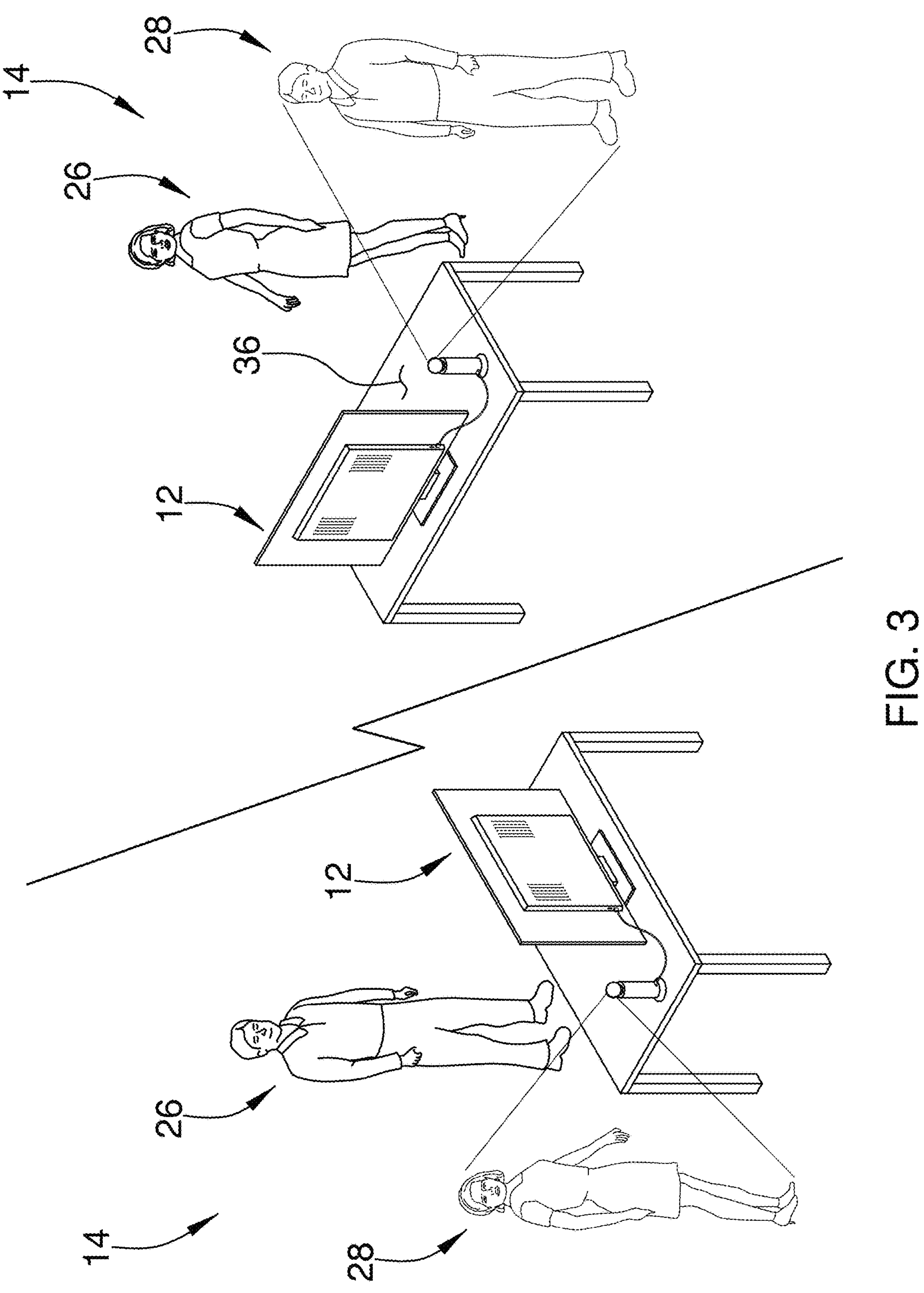
FIG. 3 is a perspective in-use view of an embodiment of the disclosure.
Figure 4:
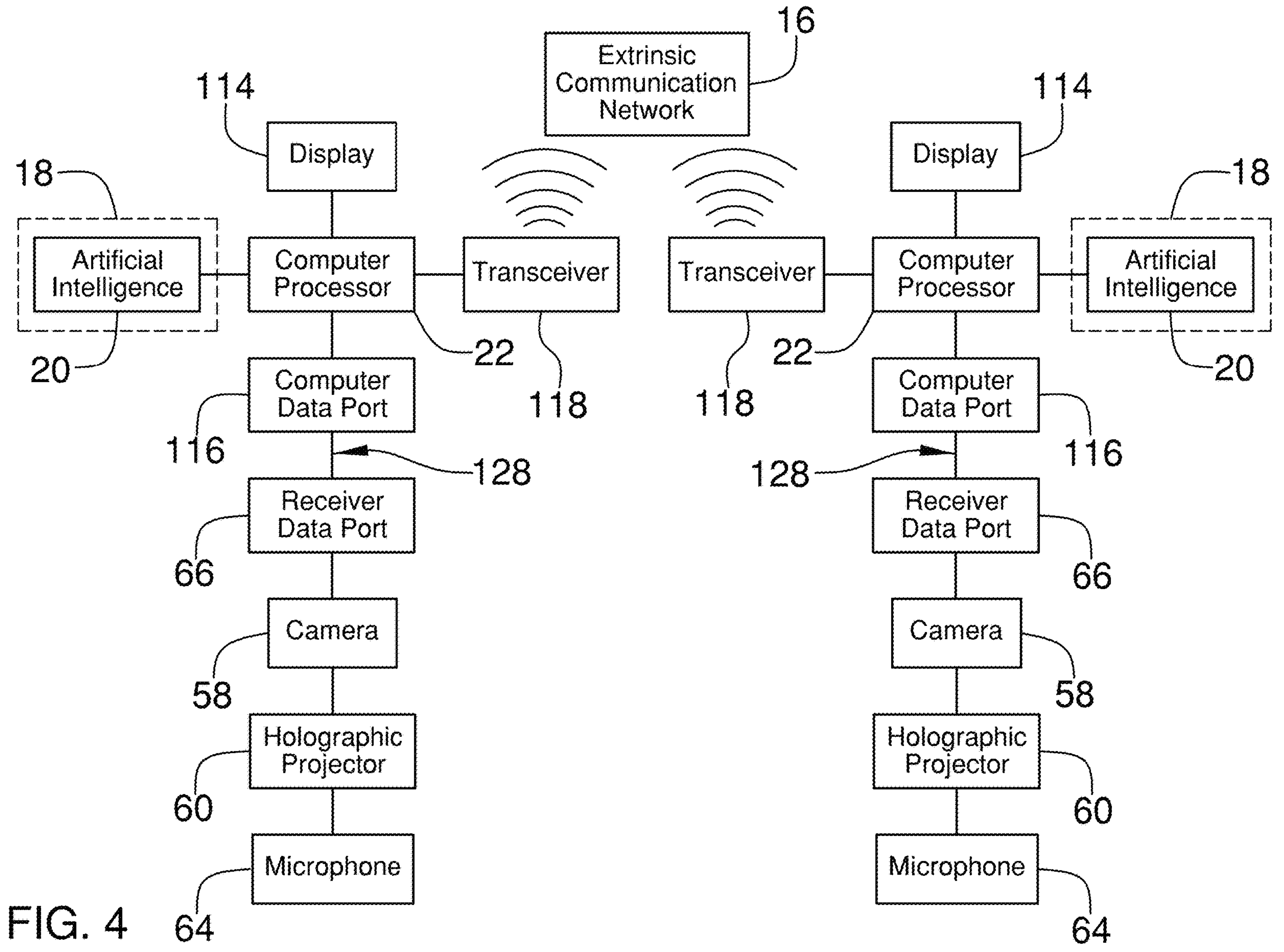
FIG. 4 is a schematic view of an embodiment of the disclosure.
Figure 5:
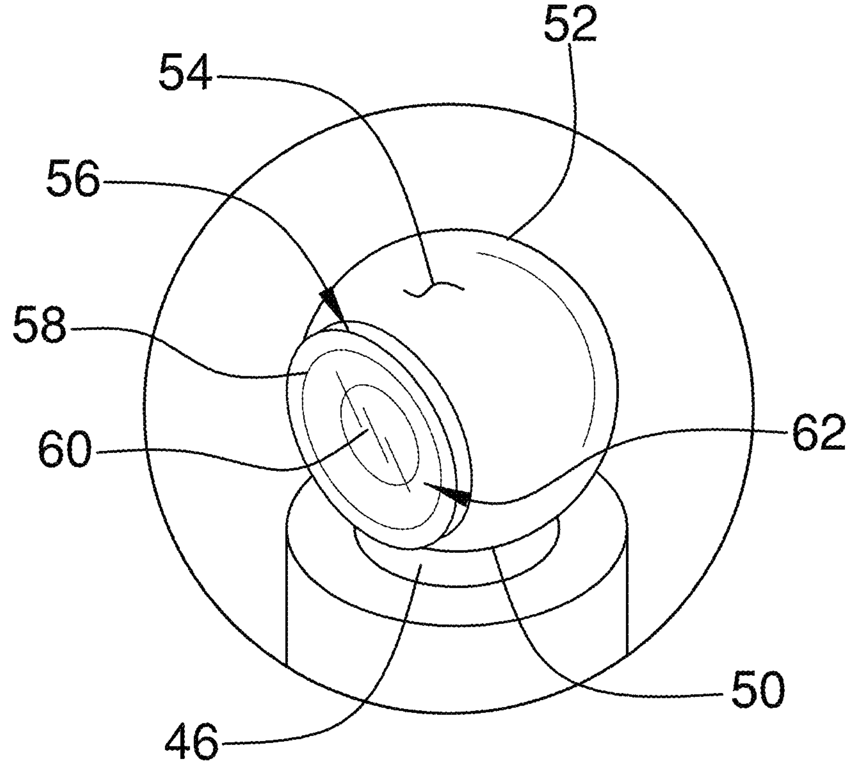
FIG. 5 is a magnified detail view taken from circle 5 of FIG. 1 of an embodiment of the disclosure.

With reference now to the drawings, and in particular to FIGS. 1 through 5 thereof, a new holographic device embodying the principles and concepts of an embodiment of the disclosure and generally designated by the reference numeral 10 will be described.

As best illustrated in FIGS. 1 through 5, the holographic communication device 10 generally comprises a plurality of computers 12 and each computer 12 of the plurality of computers 12 is located at a respective one of a plurality of locations 14 which are remote from each other. Each computer 12 of the plurality of computers 12 is in wireless communication with an extrinsic communication network 16. The extrinsic communication network 16 may comprise the internet or a cellular phone network or any other type of wireless global communication network. Each computer 12 of the plurality of computers 12 includes an electronic memory 18 and the electronic memory 18 associated with each computer 12 of the plurality of computers 12 stores a database 20 comprising an artificial intelligence. Additionally, the electronic memory 18 associated with each computer 12 of the plurality of computers 12 may store a propriety communication program that is employed for conducting remote meetings over the extrinsic communication network 16. Each computer 12 of the plurality of computers 12 includes a computer processor 22 and the computer processor 22 of a respective computer 12 is in electrical communication with the electronic memory 18 of the respective computer 12.

A plurality of receiver and holographic image processors 24 is provided and each receiver and holographic image processors 24 is located at a respective one of the plurality of locations 14. Furthermore, each receiver and holographic image processor 24 of the plurality of receiver and holographic image processors 24 captures imagery of a respective user 26 that is located at the respective location 14. Each receiver and holographic image processor 24 of the plurality of receiver and holographic image processors 24 is in electrical communication with the computer processor 22 associated with a respective computer 12. Additionally, the artificial intelligence stored in the electronic memory 18 associated with the respective computer 12 processes image data from a respective receiver and holographic image processor 24. The artificial intelligence stored in the electronic memory 18 associated with the respective computer 12 produces a holographic image 28 that is produced from the image data. Furthermore, the artificial intelligence stored in the electronic memory 18 of the respective computer 12 produces a holographic image 28 of the user 26 who is located at the respective location 14.

Each computer 12 of the plurality of computers 12 communicates the holographic image 28 produced from the image data to the extrinsic communication network 16. Additionally, each computer 12 of the plurality of computers 12 receives the image data from the extrinsic communication network 16 which was communicated from a respective computer 12. Furthermore, each receiver and holographic image processor 24 of the plurality of receiver and holographic image processors 24 produces a holographic image 28 of the user 26 who is located at the respective location 14 such that each user 26 who is located at each of the plurality of locations 14 can view holographic images 28 of other users 26.

Each receiver and holographic image processor 24 of the plurality of receiver and holographic image processors 24 includes a receiver base 30 which has a lower surface 32 and an upper surface 34 and the lower surface 32 rests upon a support surface 36. The support surface 36 may be a table, a desk or any other type of horizontal support surface. The upper surface 34 is convexly arcuate with respect to the lower surface 32 and the lower surface 32 is planar; the receiver base 30 has a hemispherical shape. Each receiver and holographic image 28 processor includes a cylinder 38 which has a bottom end 40 and a top end 42 and an outside surface 44 extending between the top end 42 and the bottom end 40. The bottom end 40 is coupled to the upper surface 34 of the receiver base 30 and the bottom end 40 is centrally located on the upper surface 34 of the receiver base 30.

Each receiver and holographic image processor 24 of the plurality of receiver and holographic image processors 24 includes a receiver stem 46 which has a coupled end 48 and a free end 50. The coupled end 48 is coupled to the top end 42 of the cylinder 38 and the coupled end 48 is centrally located on the top end 42. Each receiver and holographic image processor 24 of the plurality of receiver and holographic image processors 24 includes a ball 52 which has an outer surface 54. The outer surface 54 is coupled to the free end 50 of the receiver stem 46 such that the ball 52 is elevated above the support surface 36. Furthermore, the outer surface 54 has a planar section 56 and the ball 52 is oriented such that the planar section 56 lies on a plane which is oriented parallel to the free end 50 of the receiver stem 46.

Each receiver and holographic image processor 24 of the plurality of receiver and holographic image processors 24 includes a camera 58 which is coupled to the planar section 56 of the outer surface 54 of the ball 52. The camera 58 captures imagery of a respective user 26 who is standing in front of the camera 58. Additionally, the camera 58 may comprise a digital camera or the like which is typically employed to capture imagery which will subsequently be processed to produce a holographic image 28. Each receiver and holographic image processor 24 of the plurality of receiver and holographic image processors 24 includes a holographic projector 60 which is coupled to the planar section 56 of the outer surface 54 of the ball 52. The holographic projector 60 projects the holographic image 28 of a respective user 26 such that the holographic image 28 is visible to the user 26 who is standing in front of the camera 58. The camera 58 defines an annular ring 62 and the annular ring 62 defined by the camera 58 surrounds the holographic projector 60. Furthermore, the holographic projector 60 may comprise an electronic projector or the like which is commonly employed to project holographic images.

Each receiver and holographic image processor 24 of the plurality of receiver and holographic image processors 24 includes a microphone 64 which is integrated into the outer surface 54 of the ball 52. The microphone 64 captures words spoken by the user 26 who is standing in front of the camera 58. Each receiver and holographic image processor 24 of the plurality of receiver and holographic image processors 24 includes a receiver data port 66 which is recessed into the outside surface 44 of the cylinder 38. The receiver data port 66 is in electrical communication with the camera 58 and the receiver data port 66 is in electrical communication with the holographic projector 60 and the receiver data port 66 is in electrical communication with the microphone 64. Additionally, the receiver data port 66 may comprise a universal serial bus port or other type of high speed data port that is commonly associated with image data communication.

Each computer 12 of the plurality of computers 12 includes a computer base 68 which has a bottom surface 70 and a top surface 72; the bottom surface 70 rests upon the support surface 36. Each computer 12 of the plurality of computers 12 includes a computer stem 74 which has a bottom end 76 of the computer stem 74 and a top end 78 of the computer stem 74. The bottom end 76 of the computer stem 74 is coupled to the top surface 72 of the computer base 68 and the computer stem 74 is centrally located on the top surface 72. Each computer 12 of the plurality of computers 12 includes a display housing 80 which has a front side 82 and a back side 84 and a perimeter edge 86 extending between the front side 82 and the back side 84. The perimeter edge 86 has a lower side 88 and the lower side 88 is coupled to the top end 78 of the computer stem 74 such that the display housing 80 is elevated above the support surface 36. Additionally, the computer stem 74 is centrally located on the lower side 88.

The display housing 80 has a prominence 90 extending rearwardly from the back side 84. The perimeter edge 86 of the display housing 80 has a top side 92 and a first lateral side 94 and a second lateral side 96. The prominence 90 is positioned closer to the lower side 88 of the perimeter edge 86 than the top side 92 of the perimeter edge 86 and the prominence 90 is centrally located between the first lateral side 94 and the second lateral side 96 of the perimeter edge 86. The prominence 90 has a perimeter surface 98 and a rear surface 100; the perimeter surface 98 extends between the back side 84 of the display housing 80 and the rear surface 100. Additionally, the rear surface 100 lies on a plane which is oriented parallel to the back side 84 of the display housing 80.

The prominence 90 has a plurality of slots 102 each extending through the rear surface 100 into an interior of the prominence 90 to pass air into the interior of the prominence 90. Each slot of the plurality of slots 102 is elongated along a line extending between the top side 92 of the perimeter edge 86 of the display housing 80 and the lower side 88 of the perimeter edge 86 of the display housing 80. Additionally, the plurality of slots 102 is arranged in a pair of groups of the slots 104. The perimeter surface 98 of the prominence 90 has an upper side 106 and a lowermost side 108 and a primary lateral side 110 and a secondary lateral side 112. Each group of the pair of groups of the slots 104 is positioned closer to the upper side 106 than the lowermost side 108. Each group of the pair of groups of the slots 104 is spaced from a respective one of the primary lateral side 110 and the secondary lateral side 112. The electronic memory 18 associated with a respective computer 12 is located in the prominence 90 associated with the respective computer 12 and the computer processor 22 of a respective computer 12 is located in the prominence 90 associated with the respective computer 12.

Each computer 12 of the plurality of computers 12 includes a display 114 which is positioned on the front side 82 the display housing 80. The display 114 is in electrical communication with the computer processor 22 associated with a respective computer 12. Furthermore, the display 114 can display imagery that is visible to a respective user 26. The display 114 may comprise a light emitting diode display or other type of electronic display which can display color imagery. Each computer 12 of the plurality of computers 12 includes a computer data port 116 which is recessed into the primary lateral side 110 of the perimeter surface 98 of the prominence 90. The computer data port 116 associated with a respective computer 12 is in electrical communication with the computer processor 22 associated with the respective computer 12 which is associated with the computer data port 116. Furthermore, the computer data port 116 may comprise a universal serial bus port or other type of high speed data port commonly employed for data image communication.

Each computer 12 of the plurality of computers 12 includes a transceiver 118 that is positioned within the prominence 90. The transceiver 118 is in electrical communication with the computer processor 22 associated with a respective computer 12 which is associated with the transceiver 118. Additionally, the transceiver 118 is in communication with the extrinsic communication network 16. The transceiver 118 broadcasts the image data to the extrinsic communication network 16 that is received from the computer processor 22 associated with the respective computer 12 which is associated with the transceiver 118. Furthermore, the transceiver 118 receives the image data from the extrinsic communication network 16 which was communicated from a respective computer 12. The transceiver 118 may comprise a radio frequency transceiver or the like which may employ a WPAN signal that is in wireless communication with an internet router or the transceiver 118 may comprise a broadband transceiver or the like that has a wired connection, such as an ethernet cable for example, to an internet router.

Each computer 12 of the plurality of computers 12 includes a power cord 120 that is coupled to and extends away from the prominence 90 and the power cord 120 is in electrical communication with the computer processor 22 associated with a respective computer 12. The power cord 120 has a distal end 122 with respect to the prominence 90 and a male plug 124 is coupled to the distal end 122. The male plug 124 can be plugged into a power source 126 comprising a female electrical outlet.

A plurality of data cords 128 is provided and each data cord 128 of the plurality of data cords 128 has a first end 130 and a second end 132. Each data cord 128 of the plurality of data cords 128 has a first data plug 134 that is coupled to the first end 130. Additionally, each data cord 128 of the plurality of data cords 128 has a second data plug 136 that is coupled to the second end 132. The first data plug 134 on a respective data cord 128 is electrically mateable to the computer data port 116 associated with a respective computer 12. The second data plug 136 on the respective data cord 128 is electrically mateable to the receiver data port 66 associated with a respective receiver and holographic image processor 24. Furthermore, a respective data cord 128 places a respective receiver and holographic image processor 24 in electrical communication with the computer processor 22 associated with a respective computer 12. Each of the first data plug 134 and the second data plug 136 may comprise a universal serial bus plug or other type of high speed data plug commonly employed for communicating image data.

In use, the receiver and holographic image 28 processor that is located at a first location 14 captures imagery and captures the spoken words of a user 26 that is located at the first location 14. The receiver and holographic image 28 processor that is located at a second location 14 captures imagery and captures the spoken words of a user 26 that is located at the second location 14. Additionally, the receiver and holographic image 28 processor that is located at the first location 14 produces a holographic image 28 of the user 26 that is located at the second location 14 which can be viewed by the user 26 at the first location 14. Furthermore, the receiver and holographic image 28 processor that is located at the second location 14 produces a holographic image 28 of the user 26 that is located at the first location 14 which can be viewed by the user 26 at the second location 14. Subsequently, the user 26 at the first location 14 and the user 26 at the second location 14 can virtually communicate with each other via the holographic images 28 to simulate an in-person conversation between the user 26 at the first location 14 and the user 26 at the second location 14.

With respect to the above description then, it is to be realized that the optimum dimensional relationships for the parts of an embodiment enabled by the disclosure, to include variations in size, materials, shape, form, function and manner of operation, assembly and use, are deemed readily apparent and obvious to one skilled in the art, and all equivalent relationships to those illustrated in the drawings and described in the specification are intended to be encompassed by an embodiment of the disclosure.

Therefore, the foregoing is considered as illustrative only of the principles of the disclosure. Further, since numerous modifications and changes will readily occur to those skilled in the art, it is not desired to limit the disclosure to the exact construction and operation shown and described, and accordingly, all suitable modifications and equivalents may be resorted to, falling within the scope of the disclosure. In this patent document, the word “comprising” is used in its non-limiting sense to mean that items following the word are included, but items not specifically mentioned are not excluded. A reference to an element by the indefinite article “a” does not exclude the possibility that more than one of the element is present, unless the context clearly requires that there be only one of the elements.

I claim:

1. A holographic communication device for facilitating holographic communication, said device comprising:

a plurality of computers, each computer of said plurality of computers being located at a respective one of a plurality of locations being remote from each other, each computer of said plurality of computers being in wireless communication with an extrinsic communication network, each computer of said plurality of computers including an electronic memory, said electronic memory associated with each computer of said plurality of computers storing a database comprising an artificial intelligence, each computer of said plurality of computers including a computer processor, said computer processor of a respective computer being in electrical communication with said electronic memory of said respective computer; and a plurality of receiver and holographic image processors, each receiver and holographic image processors being located at a respective one of said plurality of locations wherein each receiver and holographic image processor of said plurality of receiver and holographic image processors is configured to capture imagery of a respective user that is located at said respective location, each receiver and holographic image processor of said plurality of receiver and holographic image processors being in electrical communication with said computer processor associated with a respective computer, said artificial intelligence being stored in said electronic memory associated with a respective computer processing image data from a respective receiver and holographic image processor, said artificial intelligence stored in said electronic memory associated with said respective computer producing a full body holographic image produced from said image data wherein said artificial intelligence stored in said electronic memory of said respective computer is configured to produce a full body holographic image of the user who is located at said respective location, each computer of said plurality of computers communicating said holographic image produced from said image data to said extrinsic communication network, each computer of said plurality of computers receiving said image data from said extrinsic communication network which was communicated from a respective computer wherein each receiver and holographic image processor of said plurality of receiver and holographic image processors is configured to produce a holographic image of the user who is located at said respective location such that each user who is located at each of said plurality of locations can view holographic images of other users;

each receiver and holographic image processor of said plurality of receiver and holographic image processors including a receiver base having a lower surface and an upper surface wherein said lower surface is configured to rest upon a support surface;

said upper surface being convexly arcuate with respect to said lower surface;

said lower surface being planar;

said receiver base having a hemispherical shape;

each receiver and holographic image processor of said plurality of receiver and holographic image processors including a cylinder having a bottom end and a top end and an outside surface extending between said top end and said bottom end, said bottom end being coupled to said upper surface of said receiver base, said bottom end being centrally located on said upper surface of said receiver base;

each receiver and holographic image processor of said plurality of receiver and holographic image processors including a receiver stem having a coupled end and a free end opposite said coupled end, said coupled end being coupled to said top end of said cylinder, said coupled end being centrally located on said top end;

each receiver and holographic image processor of said plurality of receiver and holographic image processors including a ball having an outer surface, said outer surface being coupled to said free end of said receiver stem wherein said ball is configured to be elevated above the support surface, said outer surface of said ball having a planar section, said ball being oriented such that said planar section lies on a plane being oriented perpendicular to said free end of said receiver stem and parallel to a central longitudinal axis of said cylinder;

each receiver and holographic image processor of said plurality of receiver and holographic image processors including a camera being coupled to said planar section of said outer surface of said ball wherein said camera is configured to capture imagery of a respective user who is standing in front of said camera;

each receiver and holographic image processor of said plurality of receiver and holographic image processors including a holographic projector being coupled to said planar section of said outer surface of said ball wherein said holographic projector is configured to project the holographic image of a respective user such that the holographic image is visible to the user who is standing in front of said camera;

said camera defining an annular ring; and said annular ring defined by said camera surrounding said holographic projector.

2. The holographic communication device according to claim 1, further comprising:

each receiver and holographic image processor of said plurality of receiver and holographic image processors including a microphone being integrated into said outer surface of said ball wherein said microphone is configured to capture words spoken by the user who is standing in front of said camera;

each receiver and holographic image processor of said plurality of receiver and holographic image processors including a receiver data port being recessed into said outside surface of said cylinder;

said receiver data port being in electrical communication with said camera;

said receiver data port being in electrical communication with said holographic projector; and said receiver data port being in electrical communication with said microphone.

3. The holographic communication device according to claim 1, further comprising:

each computer of said plurality of computers includes a computer base having a bottom surface and a top surface wherein said bottom surface is configured to rest upon a support surface;

each computer of said plurality of computers includes a computer stem having a bottom end of said computer stem and a top end of said computer stem;

said bottom end of said computer stem being coupled to said top surface of said computer base; and said computer stem being centrally located on said top surface.

4. The holographic communication device according to claim 3, further comprising:

each computer of said plurality of computers includes a display housing having a front side and a back side and a perimeter edge extending between said front side and said back side;

said perimeter edge having a lower side;

said lower side being coupled to said top end of said computer stem wherein said display housing is configured to be elevated above the support surface; and said computer stem being centrally located on said lower side.

5. The holographic communication device according to claim 4, further comprising:

said display housing having a prominence extending rearwardly from said back side;

said perimeter edge of said display housing having a top side and a first lateral side and a second lateral side;

said prominence being positioned closer to said lower side of said perimeter edge than said top side of said perimeter edge;

said prominence being centrally located between said first lateral side and said second lateral side;

said prominence having a perimeter surface and a rear surface;

said perimeter surface extending between said back side of said display housing and said rear surface; and said rear surface lying on a plane being oriented parallel to said back side of said display housing.

6. The holographic communication device according to claim 5, further comprising:

said prominence having a plurality of slots each extending through said rear surface into an interior of said prominence wherein said plurality of slots is configured to pass air into said interior of said prominence;

each slot of said plurality of slots being elongated along a line extending between said top side of said perimeter edge of said display housing and said lower side of said perimeter edge of said display housing;

said plurality of slots being arranged in a pair of groups of said slots;

said perimeter surface of said prominence having an upper side and a lowermost side and a primary lateral side and a secondary lateral side;

each group of said pair of groups of said slots being positioned closer to said upper side than said lowermost side; and each group of said pair of groups of said slots being spaced from a respective one of said primary lateral side and said secondary lateral side.

7. The holographic communication device according to claim 4, further comprising:

each computer of said plurality of computers includes a display being positioned on said front side of said display housing;

said display being in electrical communication with said computer processor associated with a respective computer wherein said display is configured to display imagery that is visible to a respective user.

8. The holographic communication device according to claim 5, further comprising:

said perimeter surface of said prominence having a primary lateral side;

each computer of said plurality of computers includes a computer data port being recessed into said primary lateral side of said perimeter surface of said prominence; and said computer data port associated with a respective computer being in electrical communication with said computer processor associated with said respective computer which is associated with said computer data port.

9. The holographic communication device according to claim 5, further comprising:

each computer of said plurality of computers includes a transceiver being positioned within said prominence;

said transceiver being in electrical communication with said computer processor associated with a respective computer which is associated with said transceiver;

said transceiver being in communication with said extrinsic communication network;

said transceiver broadcasting said image data to said extrinsic communication network which was received from said computer processor associated with said respective computer which is associated with said transceiver; and said transceiver receiving said image data from said extrinsic communication network which was communicated from a respective computer.

10. The holographic communication device according to claim 5, further comprising:

each computer of said plurality of computers includes a power cord being coupled to and extending away from said prominence;

said power cord being in electrical communication with said computer processor associated with a respective computer;

said power cord having a distal end with respect to said prominence; and said power cord having a male plug being coupled to said distal end wherein said male plug is configured to be plugged into a power source comprising a female electrical outlet.

11. The holographic communication device according to claim 8, further comprising:

each receiver and holographic image processor of said plurality of receiver and holographic image processors including a receiver data port;

a plurality of data cords;

each data cord of said plurality of data cords having a first end and a second end;

each data cord of said plurality of data cords having a first data plug being coupled to said first end;

each data cord of said plurality of data cords having a second data plug being coupled to said second end;

said first data plug on a respective data cord being electrically mateable to said computer data port associated with a respective computer;

said second data plug on said respective data cord being electrically mateable to said receiver data port associated with a respective receiver and holographic image processor; and a respective data cord placing a respective receiver and holographic image processor in electrical communication with said computer processor associated with a respective computer.

12. A holographic communication device for facilitating holographic communication, said device comprising:

a plurality of computers, each computer of said plurality of computers being located at a respective one of a plurality of locations being remote from each other, each computer of said plurality of computers being in wireless communication with an extrinsic communication network, each computer of said plurality of computers including an electronic memory, said electronic memory associated with each computer of said plurality of computers storing a database comprising an artificial intelligence, each computer of said plurality of computers including a computer processor, said computer processor of a respective computer being in electrical communication with said electronic memory of said respective computer;

a plurality of receiver and holographic image processors, each receiver and holographic image processors being located at a respective one of said plurality of locations wherein each receiver and holographic image processor of said plurality of receiver and holographic image processors is configured to capture imagery of a respective user that is located at said respective location, each receiver and holographic image processor of said plurality of receiver and holographic image processors being in electrical communication with said computer processor associated with a respective computer, said artificial intelligence being stored in said electronic memory associated with a respective computer processing image data from a respective receiver and holographic image processor, said artificial intelligence stored in said electronic memory associated with said respective computer producing a full body holographic image produced from said image data wherein said artificial intelligence stored in said electronic memory of said respective computer is configured to produce a full body holographic image of the user who is located at said respective location, each computer of said plurality of computers communicating said holographic image produced from said image data to said extrinsic communication network, each computer of said plurality of computers receiving said image data from said extrinsic communication network which was communicated from a respective computer wherein each receiver and holographic image processor of said plurality of receiver and holographic image processors is configured to produce a holographic image of the user who is located at said respective location such that each user who is located at each of said plurality of locations can view holographic images of other users, each receiver and holographic image processor of said plurality of receiver and holographic image processors comprising:

a receiver base having a lower surface and an upper surface wherein said lower surface is configured to rest upon a support surface, said upper surface being convexly arcuate with respect to said lower surface, said lower surface being planar, said receiver base having a hemispherical shape;

a cylinder having a bottom end and a top end and an outside surface extending between said top end and said bottom end, said bottom end being coupled to said upper surface of said receiver base, said bottom end being centrally located on said upper surface of said receiver base;

a receiver stem having a coupled end and a free end, said coupled end being coupled to said top end of said cylinder, said coupled end being centrally located on said top end;

a ball having an outer surface, said outer surface being coupled to said free end of said receiver stem wherein said ball is configured to be elevated above the support surface, said outer surface having a planar section, said ball being oriented such that said planar section lies on a plane being oriented perpendicular to said free end of said receiver stem and parallel to a central longitudinal axis of said cylinder;

a camera being coupled to said planar section of said outer surface of said ball wherein said camera is configured to capture imagery of a respective user who is standing in front of said camera;

a holographic projector being coupled to said planar section of said outer surface of said ball wherein said holographic projector is configured to project the holographic image of a respective user such that the holographic image is visible to the user who is standing in front of said camera, said camera defining an annular ring, said annular ring defined by said camera surrounding said holographic projector;

a microphone being integrated into said outer surface of said ball wherein said microphone is configured to capture words spoken by the user who is standing in front of said camera; and a receiver data port being recessed into said outside surface of said cylinder, said receiver data port being in electrical communication with said camera, said receiver data port being in electrical communication with said holographic projector, said receiver data port being in electrical communication with said microphone;

wherein each computer of said plurality of computers comprises:

a computer base having a bottom surface and a top surface wherein said bottom surface is configured to rest upon the support surface;

a computer stem having a bottom end of said computer stem and a top end of said computer stem, said bottom end of said computer stem being coupled to said top surface of said computer base, said computer stem being centrally located on said top surface;

a display housing having a front side and a back side and a perimeter edge extending between said front side and said back side, said perimeter edge having a lower side, said lower side being coupled to said top end of said computer stem wherein said display housing is configured to be elevated above the support surface, said computer stem being centrally located on said lower side, said display housing having a prominence extending rearwardly from said back side, said perimeter edge of said display housing having a top side and a first lateral side and a second lateral side, said prominence being positioned closer to said lower side of said perimeter edge than said top side of said perimeter edge, said prominence being centrally located between said first lateral side and said second lateral side of said perimeter edge, said prominence having a perimeter surface and a rear surface, said perimeter surface extending between said back side of said display housing and said rear surface, said rear surface lying on a plane being oriented parallel to said back side of said display housing, said prominence having a plurality of slots each extending through said rear surface into an interior of said prominence wherein said plurality of slots is configured to pass air into said interior of said prominence, each slot of said plurality of slots being elongated along a line extending between said top side of said perimeter edge of said display housing and said lower side of said perimeter edge of said display housing, said plurality of slots being arranged in a pair of groups of said slots, said perimeter surface of said prominence having an upper side and a lowermost side and a primary lateral side and a secondary lateral side, each group of said pair of groups of said slots being positioned closer to said upper side than said lowermost side, each group of said pair of groups of said slots being spaced from a respective one of said primary lateral side and said secondary lateral side, said electronic memory associated with a respective computer being located in said prominence associated with said respective computer, said computer processor of a respective computer being located in said prominence associated with said respective computer;

a display being positioned on said front side of said display housing, said display being in electrical communication with said computer processor associated with a respective computer wherein said display is configured to display imagery that is visible to a respective user;

a computer data port being recessed into said primary lateral side of said perimeter surface of said prominence, said computer data port associated with a respective computer being in electrical communication with said computer processor associated with said respective computer which is associated with said computer data port;

a transceiver being positioned within said prominence, said transceiver being in electrical communication with said computer processor associated with a respective computer which is associated with said transceiver, said transceiver being in communication with said extrinsic communication network, said transceiver broadcasting said image data to said extrinsic communication network which was received from said computer processor associated with said respective computer which is associated with said transceiver, said transceiver receiving said image data from said extrinsic communication network which was communicated from a respective computer;

a power cord being coupled to and extending away from said prominence, said power cord being in electrical communication with said computer processor associated with a respective computer, said power cord having a distal end with respect to said prominence, said power cord having a male plug being coupled to said distal end wherein said male plug is configured to be plugged into a power source comprising a female electrical outlet; and a plurality of data cords, each data cord of said plurality of data cords having a first end and a second end, each data cord of said plurality of data cords having a first data plug being coupled to said first end, each data cord of said plurality of data cords having a second data plug being coupled to said second end, said first data plug on a respective data cord being electrically mateable to said computer data port associated with a respective computer, said second data plug on said respective data cord being electrically mateable to said receiver data port associated with a respective receiver and holographic image processor, a respective data cord placing a respective receiver and holographic image processor in electrical communication with said computer processor associated with a respective computer.

* * * * *